US012046061B2

(12) United States Patent
Xu

(10) Patent No.: US 12,046,061 B2
(45) Date of Patent: Jul. 23, 2024

(54) HANDWRITING RECOGNITION METHOD AND APPARATUS EMPLOYING CONTENT AWARE AND STYLE AWARE DATA AUGMENTATION

(71) Applicant: KONICA MINOLTA BUSINESS SOLUTIONS U.S.A., INC., Foster City, CA (US)

(72) Inventor: Ting Xu, Campbell, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 344 days.

(21) Appl. No.: 17/364,641

(22) Filed: Jun. 30, 2021

(65) Prior Publication Data

US 2023/0004741 A1 Jan. 5, 2023

(51) Int. Cl.
*G06V 30/00* (2022.01)
*G06F 18/211* (2023.01)
*G06N 3/045* (2023.01)
*G06N 3/08* (2023.01)
*G06V 30/32* (2022.01)

(52) U.S. Cl.
CPC ............ *G06V 30/36* (2022.01); *G06F 18/211* (2023.01); *G06N 3/045* (2023.01); *G06N 3/08* (2013.01)

(58) Field of Classification Search
CPC ...... G06V 30/36; G06V 10/774; G06V 10/82; G06F 18/211; G06N 3/045; G06N 3/08; G06N 3/0442; G06N 3/0455; G06N 3/0464; G06N 3/084; G06N 3/096
See application file for complete search history.

(56) References Cited

U.S. PATENT DOCUMENTS

| 7,227,993 | B2 | 6/2007 | Xu et al. |
| 7,646,913 | B2 | 1/2010 | Abdulkader et al. |
| 2018/0373999 | A1* | 12/2018 | Xu .................. G06V 10/774 |

(Continued)

FOREIGN PATENT DOCUMENTS

| CN | 110866501 A | * | 3/2020 | ......... G06K 9/00402 |
| CN | 112633423 A | * | 4/2021 | |

OTHER PUBLICATIONS

Wigington et al, Data Augmentation for Recognition of Handwritten Words and Lines using a CNN-LSTM Network, 14th IAPR International Conference on Document Analysis and Recognition (Year: 2017).*

(Continued)

*Primary Examiner* — Ping Y Hsieh
*Assistant Examiner* — Xiao Liu
(74) *Attorney, Agent, or Firm* — SQUIRE PATTON BOGGS (US) LLP

(57) ABSTRACT

A content aware and style aware neural network based data augmentation model generates augmented data sets to train neural network based handwriting recognition models to recognize individuals' handwriting. The augmented data sets may be generated so as to be artificial, and to lack personal or confidential information. The data augmentation model may generate content reference sets of individual characters generated in different fonts, and style reference sets of pluralities of characters of a particular style, for example, an individual's handwriting.

20 Claims, 2 Drawing Sheets

(56) References Cited

U.S. PATENT DOCUMENTS

2021/0209401 A1* 7/2021 Zhang ............... G06V 30/1988

OTHER PUBLICATIONS

Lian et al., Automatic Generation of Large-scale Handwriting Fonts via Style Learning, SA '16: SIGGRAPH Asia Technical Briefs (Year: 2016).*

Cubuk et al., AutoAugment: Learning Augmentation Strategies from Data, arXiv :805.09501v3 Apr. 11, 2019.*

Frid-Adar et al., Synthetic Data Augmentation Using GAN for Improved Liver Lesion Classification, 2018 IEEE 15th International Symposium on Biomedical Imaging (ISBI 2018) Apr. 4-7, Washington, D.C., USA (Year: 2018).*

Wang et al, The Effectiveness of Data Augmentation in Image Classification using Deep Learning, arXiv:1712.04621 (Year: 2017).*

Zhang et al, Separating Style and Content for Generalized Style Transfer, CVPR (Year: 2018).*

Dutta et al, Improving CNN-RNN Hybrid Networks for Handwriting Recognition, 16th International Conference on Frontiers in Handwriting Recognition (Year: 2018).*

Graves Generating sequences with recurrent neural networks arXiv:1308.0850v4 Jun. 5, 2014.*

Mikolov et al, Subword language modeling with neural networks. Technical report (Year: 2012).*

Aggarwal, "Bi-LSTM", Jul. 4, 2019, https://medium.com/@raghavaggarwal0089/bi-lstm-bc3d68da8bd0.

Christopher Thomas BSc Hons. MIAP, Feb. 21, 2020 "Deep learning image enhancement insights on loss function engineering", https://towardsdatascience.com/deep-learning-image-enhancement-insights-on-loss-function-engineering-f57ccbb585d7.

Jay Alammar, "The Illustrated Transformer", Visualizing machine learning one concept at a time; https://jalammar.github.io/illustrated-transformer/.

Kairouz et al., "Advances and Open Problems in Federated Learning", 121 pages. https://www.tensorflow.org/datasets/api_docs/python/tfds/as_numpy ; https://www.kaggle.com/stackoverflow/stackoverflow.

Rajesh Shreedhar BHAT, "Text Recognition With CRNN-CTC Network", This report explains how to detect & recognize text from images; https://wandb.ai/authors/text-recognition-crnn-ctc/reports/Text-Recognition-With-CRNN-CTC-Network-VrnlldzoxNTI5NDI.

Scheidl et al., "An Intuitive Explanation of Connectionist Temporal Classification", https:/towardsdatascience.com/intuitively-understanding-connectionist-temporal-classificatin-3797e43a86c.

Tenenbaum et al., "Separating Style and Content", 1997:662-8.

Utkarsh Ankit, "Transformer Neural Network: Step-By-Step Breakdown of the Beast", Towards Data Science, Apr. 24, 2020; https://towardsdatascience.com/transformer-neural-network-step-by-step-breakdown-of-the-beast-b3e096dc857f.

Vaswani et al., "Attention Is All You Need", 31st Conference on Neural Information Processing Systems (NIPS 2017), Long Beach, CA, USA., 15 pages.

Xie et al., "CoTr: Efficiently Bridging CNN and Transformer for 3D Medical Image Segmentation", https://www.synapse.org/#!Synapse:syn3193805/wiki/217789 ; 13 pages.

Zhang et al., "Separating Style and Content for Generalized Style Transfer", In Proceedings of the IEEE conference on computer vision and pattern recognition 2018, pp. 8447-8455.

* cited by examiner

HANDWRITING RECOGNITION METHOD AND APPARATUS EMPLOYING CONTENT AWARE AND STYLE AWARE DATA AUGMENTATION

FIELD OF THE INVENTION

Aspects of the present invention relate to handwriting recognition, and in particular to augmentation of data sets to train handwriting recognition systems.

BACKGROUND OF THE INVENTION

One of the numerous challenges in handwriting recognition is the need to compensate for different handwriting styles. Even the same individual can have different handwriting as they get older. The same individual's handwriting can be different on different surfaces, or when the individual uses different writing instruments, or when the individual is forced to write in cramped spaces (for example, filling out a form that provides very little space in its field).

One term for these changes is called a data distribution shift, where the probability distribution of test samples is different from that of training samples (x, y) that are used to train a handwriting recognition system. When test samples are drawn from a different probability distribution P(x, y), it can cause the handwriting recognition system to vary away from a desired result. One way of addressing this problem is to transfer learning from the original model onto the new data. However, taking this approach can cause issues with sufficiency of data, and with data privacy.

When handwriting samples are used to train a model, it can be difficult to obtain enough useful samples; hence the data sufficiency problem. Moreover, the samples themselves may contain types of information that the handwriter would not want made public; hence the data privacy problem. Depending on the model size and which parts of the model need to be fine-tuned, customer data still may be insufficient, even for transfer learning. In addition, it is necessary for the customer to identify and/or label this customer data. Further, since the data originates with the customer, on one or more customer devices, this data needs to be transferred to a service provider. This transfer is how the data privacy concerns can arise. Recent efforts to advance collaborative distributed learning, such as Federated Learning, provide an approach to address this issue. As an example of this kind of approach, multiple sources (local devices) may receive a model from a central server. Each source provides an update to the model, using data stored locally at the source. The update, but not the locally stored data, is transmitted back to the central server For handwriting recognition, the issue of data distribution P(x, y) drift is quite pronounced because of unique handwriting styles for each individual. For example, different people are likely to write the same character in different ways, whether with the same instrument or with a different instrument, or in different ways in different places (for example, in a relatively cramped area on a form compared with an open space on a sheet of paper), or at the same time or at different times (since people's handwriting tends to evolve with age). Technically, this is one type of data drift called "concept drift," where the conditional probability, or likelihood, P(x|y), meaning that the probability of x (an image) occurring given that y (a character) occurred, can differ from training to production. Another type of drift is "prior drift," where the prior probability P(y) changes as a result of a change in content distribution. For example, in kanji, depending on the topic, the text can employ different characters, with different frequencies. All of the foregoing takes into account Bayes theorem, according to which P(x, y)=P(x|y)P(y).

An additional challenge is the ability to obtain sufficient data to train a handwriting recognition system, particularly a neural network-based system. Even the most sophisticated recognition models do not work well if there is not enough training data of suitable relevance.

SUMMARY OF THE INVENTION

To address the foregoing, aspects of the present invention provide a data augmentation technique that can synthesize training data similar to customer's data in both style and content to produce augmented data. Style similarity diminishes concept drift, keeping P(x|y) the same or almost the same as the conditional probability for customer data. Content relevance reduces prior drift, and keeps P(y) the same or almost the same as the prior probability for customer data.

Since the augmented data are artificially generated, the data pose fewer privacy issues even if the data are uploaded to the cloud. On the other hand, the substantial availability of synthesized data removes data scarcity as a concern for transfer learning.

BRIEF DESCRIPTION OF THE DRAWINGS

Aspects of the invention now will be described with reference to embodiments as illustrated in the accompanying drawings, in which.

DETAILED DESCRIPTION OF EMBODIMENTS

Figure 1:
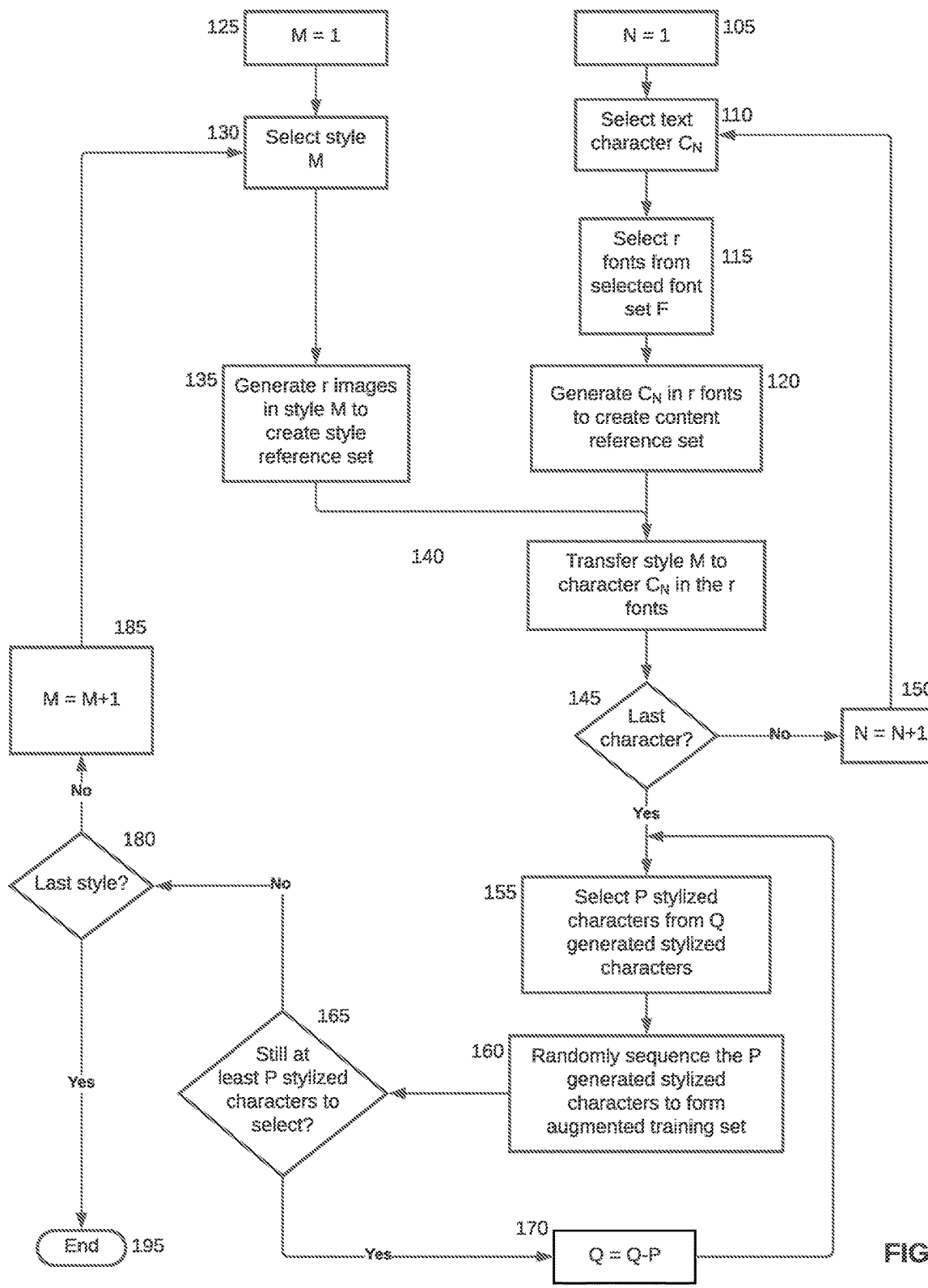
FIG. 1 shows a high level flow chart for providing augmented data sets according to an embodiment.

Embodiments of the present invention may provide a computer-implemented method comprising:
  selecting a text character from a plurality of text characters;
  selecting a plurality of fonts from a font set;
  generating the text character in each of the plurality of fonts to generate a content reference set;
  selecting a plurality of images from an image set to generate a style reference set comprising a style selected from a plurality of styles;
  transferring the style to the text character in each of the plurality of fonts to generate a set of stylized characters;
  selecting a plurality of stylized characters from the set;
  randomly sequencing the plurality of stylized characters to form an augmented data set; and
  applying the augmented data set to a handwriting recognition system as a training set.

In embodiments, the listed actions may be repeated for each of the plurality of text characters, or for each of the plurality of styles.

In embodiments, the content reference set may be generated before the style reference set, or the style reference set may be generated before the content reference set.

In an embodiment, at least one of the content reference set and the style reference set is selected from previously-generated reference sets.

In an embodiment, the selected text character may be generated from an augmented data set generator comprising a recurrent neural network/long short term memory language (RNN/LSTM LM) model. In an embodiment, that model may be trained by updating weights using cross-entropy loss calculation.

In an embodiment, the mentioned handwriting recognition system may be used to recognize handwriting. The handwriting recognition model may employ a neural network based system selected from the group consisting of a convolutional neural network (CNN), in conjunction with a bidirectional LSTM (CRNN); and a CNN in combination with a transformer neural network. In embodiments, the handwriting recognition model may be trained by updating weights using a loss calculation selected from the group consisting of cross-entropy loss and connectionist temporal classification (CTC) loss.

Embodiments of the present invention also may provide an apparatus comprising:
a neural network based augmented data set generator to generate an augmented data set, the augmented data set generator comprising:
a content encoder to generate a content reference set comprising a text character selected from a plurality of text characters, the text character generated in each of a plurality of fonts;
a style encoder to generate a style reference set comprising a plurality of images comprising text characters represented in a style selected from a plurality of styles;
a mixer to transfer the style to the text character in each of the plurality of fonts to generate a set of stylized characters;
a selector to select a plurality of stylized characters from the set; and
a randomized stitcher to randomly sequence the plurality of stylized characters to generate the augmented data set;

In an embodiment, the apparatus further may comprise a neural network based handwriting recognition system to receive the augmented data set from the augmented data set generator as a training set, and to recognize handwriting.

In an embodiment, the augmented data set generator may generate a plurality of augmented data sets, one for each of the plurality of text characters, and/or one for each of the plurality of styles.

In an embodiment, the augmented data set generator may comprise a recurrent neural network/long short term memory language (RNN/LSTM LM) model to generate the text character. In an embodiment, the model may be trained by updating weights using cross-entropy loss calculation.

In an embodiment, the handwriting recognition system may comprise a neural network based model selected from the group consisting of: a convolutional neural network (CNN), in conjunction with a bidirectional LSTM (CRNN); and a CNN in combination with a transformer neural network (CNN+transformer).

In an embodiment, the CRNN may be trained using connectionist temporal classification (CTC) loss calculation. In an embodiment, the CNN+transformer may be trained using cross-entropy loss calculation.

In an embodiment, the mixer may comprise a bilinear model to map the content reference set and the style reference set to generate the set of stylized characters.

In an embodiment, the apparatus further may comprise imaging equipment to provide some or all of the plurality of text characters used to generate the content reference set, and/or some or all of the plurality of images used to generate the style reference set.

Aspects of the present invention address the data shift problem through improved data augmentation, generating data that more relevant in both content and style. In this manner, it is possible to improve the effectiveness of transfer learning on data from a given customer, leading to a more accurate handwriting recognition model for that customer—effectively, a type of model customization.

Using the described techniques in accordance with aspects of the invention, it is possible to generate relevant content in a user's handwriting style without revealing sensitive customer or user content. Moreover, content and style related data augmentation models need not be trained on customer or user data. In this manner, a customer's or user's data privacy on the server side of the system may be protected, even as a handwriting recognition model is trained to recognize handwriting of a particular user. Thus, for example, transfer learning, a machine learning method in which a model which is developed to accomplish one task, may be used as the starting point for a model being developed to accomplish another task.

The following describes synthesis of line images of characters and/or letters (so-called "relevant" content) with handwriting style superimposed thereon or combined therewith.

In Asian languages such as Chinese or Japanese, the alphabet contains thousands of characters, mainly Kanji. The words that are spelled out in such characters, for example, may have substantial influence over what characters may appear. Different characters may be pronounced the same way, but may have very different meanings, and so some characters may be less appropriate in some words than in others. As a result, the prior probability distribution of characters (especially Kanji) can vary depending on the subject. Accordingly, generating relevant text can make the prior distribution P(y) more similar to that of actual customer content.

Relevant text does not necessarily mean fully comprehensible, however. In an embodiment, a character-level recurrent neural network (RNN)/long short-term memory (LSTM) language model (LM) may be employed, because the generated text is not, and is not intended to be for human comprehension. Rather, the idea is to be able to train the system to recognize someone's handwriting, and in particular, different characters or letters that a person may write. In that context, whether the word strings make sense need not matter. What matters more is appropriate coverage of text content in terms of characters and combinations of characters in words and/or phrases in the line images. Individual words may make sense. In a given discipline, such as finance, certain types of characters may be expected in words, and so, for individual words, prior probability distribution can be relevant and useful. While individual words may make sense, however, strings of those words may not. Within a word, prior probability distribution can be applied. With random generation of words, for example, to create the augmented data to generate training sets, the presence of a word in a word string may not have an effect on the likelihood of the presence of a following word. Comprehensibility of resulting words or phrases or sentences is not so important in one or more of the described embodiments.

Where individual words are intended to make sense, prior probability distribution can be applied, as individual characters forming character strings will have a dependence and a context in a given discipline. In an embodiment, character strings need not make sense, however.

In an embodiment, a text generator may be a standard RNN/LSTM character-level language model (LM) trained on a topic-specific corpus such as transportation, financial, medical, legal, scientific (engineering, chemistry, biology), or the like. Depending on the size of available topic-specific corpus, a single layer or a multi-layer RNN/LSTM may be used. The corpus, which is a sequence of characters, may be fed into the LM to predict the probability distribution of each character, given the presence of previous characters. A loss function may be computed as a cross-entropy between the predicted probability distribution and the true next character (a one-hot vector). This character-level LM may be trained with standard back propagation through time. The training input may be a simple one-hot vector encoding the character index in the alphabet. Both the loss function and the gradients for a batch of sentences may be computed. In an embodiment, gradient descent or, in a more specific embodiment, stochastic gradient descent may be employed to update the model weights.

In an embodiment, neural style transfer may be employed to good advantage. In neural transfer, a content image and a style image may be combined. There may be an input image to be styled. That may be the content image, or it may be another image. In the context of alphabets, character strings, and the like, a content image may be a letter, or a character. A style image might be a font, or a handwriting style. By imposing, or superimposing, or combining the content image and the style image, it may be possible to provide handwriting style for characters, even if there may be no specific handwriting example from a particular user.

Indeed, since a customer's handwriting style may not be known beforehand, thus preventing the training of a targeted style transfer model, it must be possible to generalize to a new style during testing.

There are bilinear models which are two factor models that can separate and/or fuse content and style in a flexible manner. In an embodiment, this type of property may be favorable in a transfer model. One such model, called EMD (encoder-mixer-decoder), utilizes a bilinear model as a content-style mixer in an encoder-decoder architecture. This model maps the content reference set and the style reference set to a target image with corresponding content (character class) and style.

As will be explained below, in an embodiment such a model may be utilized to transfer the style of some handwriting character images to some font-rendered character images with desired content. In this manner, it is possible to generalize to new styles once the model is trained. In an embodiment, using such a model can obviate the need to retrain for a new style during testing.

This ability to avoid retraining can be particularly useful because of the diversity of handwriting styles. In terms of available style images, for example, handwriting style can be so diverse as to be likely underrepresented in or even absent from training data.

In an embodiment, the model is trained using both font-rendered character images and real handwritten character images. In an embodiment, a font set F may be selected as the style images. A handwritten character image set H also may have style information (such as the identification of the writer), but also provides character images, of course.

In an embodiment, a handwritten character image T may be selected randomly as a target image from an image set S, with a character C in that image written by an individual P.

In one aspect, a number of fonts, r, also may be selected randomly in order to render the character C. In this manner, a result is a content reference set comprising r images of the character C. At the same time, the same or a similar number r of images (in which characters may or may not be the character C) written by the individual P also may be randomly selected as the style reference set. These two sets—the content reference set and the style reference set—may be inputs to the model. A target image T may be taken as the ground truth for training the style transfer model.

In an embodiment, instead of transferring styles among fonts, handwritten style (of handwritten character images) may be transferred to content images rendered by a font. The content images may be sampled using only font rendered images. The style images may be sampled only from handwritten character images. The trained EMD model then may be used to transfer a style of an individual's handwriting image to a font rendered image.

In an embodiment, as discussed previously, in the generation of training samples during testing (using text generation and style transfer), training is not required.

During testing, an initial input of characters may be provided to the character language model. Through repeated sampling, it is possible to generate relevant textual content. In an embodiment, such sampled characters as an output, in turn can become an input for a next iteration or step.

In an embodiment, each character in a generated set of text may be considered to be one content target, to be rendered by r fonts randomly selected from the font set F. The r font images then form the content reference set, which is one of the two inputs to the style transferer. Thus, a content reference set may be a single character reproduced in r styles each corresponding to a different font.

In turn, the targeted style may be specified by the style reference set, consisting of r character images segmented from scanned documents of an individual. In an embodiment, a handwriting character detection model may be used. Alternatively, characters can be segmented from document line images by one or more known character segmentation algorithms. Thus, a style reference set may be a plurality of r characters reproduced in a single style.

After the content reference set and the style reference sets are generated, these may be fed into a style transfer model which will generate a character image with targeted content (character class) and handwriting style.

After generating individual character images, various ones of the individual character images can be assembled (put together, or "stitched") as line images. These line images can become final augmented samples to facilitate transfer learning. Corresponding content for each line image may be the ground truth label for that sample. Generating line images involves randomizing location, size, and other characteristics of individual character images as the character images are put into a sequence to form a line image. The randomizing of various character image characteristics can yield a more robust training set.

Image stitching can connote a matching of size and format in order to provide a seamless line image. Such seamlessness may be desirable in some situations according to embodiments of the present invention. However, as just noted, generating lines of character images can involve randomization of various characteristics of individual character images. When the character images are assembled, the resulting line image may or may not reflect seamlessness in stitching. In fact, in some embodiments, because handwriting can have random variations for any number of reasons, it may be desirable not to normalize character images to enable seamless assembly of line images. In the case of kanji and similar characters, this may particularly be the case. In the case of other types of handwriting, for example, for English or other alphabets, seamlessness of stitching may be desirable in order to provide training sets that more nearly resemble cursive writing.

FIG. 1 shows a high level flow chart for generated an augmented training set according to an embodiment. The process may start by selecting a first character $C_N$. At 105 and 110, this may be done by setting a counter N=1 and denoting the first character as $C_1$. At 115, from a selected font set F, a number r of fonts may be selected. At 120, the character $C_N$ may be generated in each of the r fonts to create a content reference set. This generation may be carried out as an encoding process.

In another aspect of the process, a first style M may be selected. At 125 and 130, this may be done by setting a counter M=1. At 130, style M is selected. At 135, r images in that style M are generated to create a style reference set. In an embodiment, the images may be a plurality of characters or letters. This generation may be carried out as an encoding process.

At 140, style M is transferred to character $C_N$ in the r fonts to generate stylized characters. From the earlier discussion, this transfer may be carried out as a mixing process, using a bilinear model. At 145 and 150, the process may repeat, returning flow to 110, until all of the characters $C_N$ have been accounted for. Once this is done, at 155 a plurality P of generated stylized characters is selected from Q characters generated by the mixing process. From the earlier discussion, this may be understood as a decoding process. At 160, an augmented training set may be formed from a random sequence of the P generated stylized characters. The process repeats by iterating through 155 and 160, P characters at a time, so long as there are still at least P stylized characters to select. P need not be fixed but can be a random number at each iteration in order to generate samples with varied line length.

In FIG. 1, the just-discussed sequence may be repeated for each of a plurality of styles, until all styles have been accounted for. For example, in FIGS. 1, at 180 and 185, the process may repeat, returning flow to 130 for selection of another style, until all styles have been accounted for. Once that is accomplished, at 195 the process ends. However, for purposes of training a handwriting recognition system to recognize a particular handwriting style, the process may focus on just an augmented training set for that particular handwriting style. In this embodiment, it may be unnecessary to select multiple styles and iterate the process on the multiple styles.

Ordinarily skilled artisans will appreciate that creation of a style reference set and a content reference set need not proceed in a particular order. The two sets may be generated in parallel, or one may be generated before the other. As another alternative, a plurality of such sets may be created in advance, with "creation" of a style reference set and/or a character reference set coming from selection of one such set from a plurality of such sets.

Figure 2:
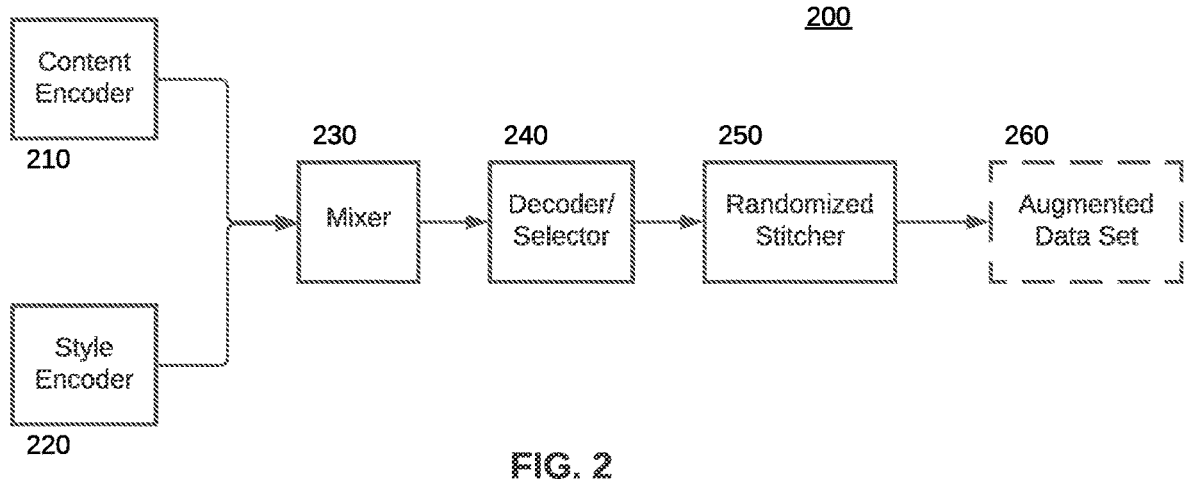
FIG. 2 shows a high level block diagram of structure for providing augmented data sets according to an embodiment.

FIG. 2 shows a high level block diagram of various elements of an apparatus 200 for generating augmented data sets according to embodiments. A content encoder 210 and a style encoder 220 respectively provide the content reference set and the style reference set mentioned above. In an embodiment, one or both of these encoders may employ downsampling by a series of convolution layers. In an embodiment, content encoder 210 may obtain the necessary text characters and fonts from storage (for example, storage 360 in FIG. 3). Similarly, style encoder 220 may obtain the necessary images and styles from storage 360.

Mixer 230 receives the content reference set from content encoder 210 and the style reference set from style encoder 220 to transfer the style reflected in the style reference set to the characters in the content reference set. In an embodiment, the mixer may employ a bilinear model as discussed above.

Decoder 240 receives an output of mixer 230. In an embodiment, the decoder may employ upsampling by a series of deconvolution layers. Decoder 240 outputs stylized characters. In an embodiment, decoder may include a selector to enable selection of some of the stylized characters being output. Randomized stitcher 250 receives an output of decoder/selector 240 and randomizes the sequence of the selected stylized characters to output augmented data set 260. Employing randomization can yield an enhanced data set which improves training of the handwriting recognition model.

Figure 3:
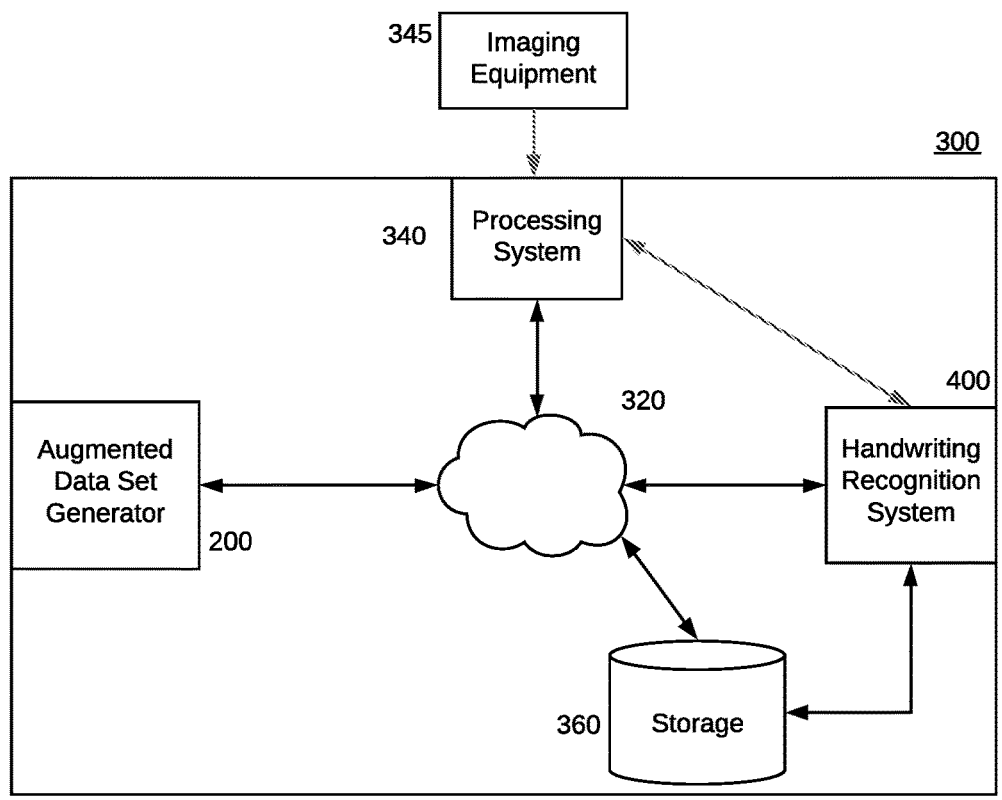
FIG. 3 shows a high level block diagram of an exemplary computing system for handwriting recognition according to an embodiment.

FIG. 3 is a high level block diagram of a computing system 300 which, among other things, can use the augmented data set to train the handwriting recognition model according to an embodiment. System 300 may include the augmented data set generator 200 of FIG. 2. The augmented data set generator 200 may communicate with a handwriting recognition system 400 directly, or may do so through a network 320, which may be a wired or a wireless network or, in an embodiment, the cloud. System 300 also may include processing system 340 which in turn may include one or more processors, one or more storage devices, and one or more solid-state memory systems (which are different from the storage devices, and which may include both non-transitory and transitory memory). There also may be additional storage 360, which may be accessible directly or via network 320. Augmented data set generator 200 may communicate directly with storage 360, or may do so via network 320.

In an embodiment, as noted earlier, storage 360 may provide content and fonts for content encoder 210, and/or may provide images and styles for style encoder 220. Computing system 300, an in particular processing system 340, may obtain the content and fonts, and images and styles stored in storage 360 by external means such as scanners, cameras, or other imaging equipment 345. In an embodiment, processing system 340 may provide processing power for augmented data set generator 200. Alternatively, the various elements of augmented data set generator 200 may employ their own processing units.

Where network 320 is a cloud system for communication, one or more portions of computing system 300 may be remote from other portions. In an embodiment, even where the various elements are co-located, network 320 may be a cloud-based system.

In an embodiment, the handwriting recognition system 400 may be based on a convolutional neural network (CNN), in conjunction with a bidirectional LSTM. Such an architecture is known to ordinarily skilled artisans as CRNN. In an embodiment, connectionist temporal classification (CTC) loss may computed and used to train the CRNN model. Ordinarily skilled artisans understand such a configuration to constitute an encoder, with no corresponding decoder structure. CTC loss computation is known to ordinarily skilled artisans. In a further embodiment, the handwriting recognition system 400 may be based on a CNN in combination with a transformer neural network. Ordinarily skilled artisans understand such a configuration to constitute an encoder-decoder combination. In an embodiment, cross-entropy loss, mentioned earlier, may be computed, and used to train the CNN+transformer model.

The present application mentions several neural network-based architectures for implementing the handwriting recognition system 400, as well as for implementing the augmented data set generator 200. Ordinarily skilled artisans will appreciate the combination of augmented data set generator 200 and handwriting recognition system 400 yields beneficial effects according to aspects of the invention. Training of the handwriting recognition system 400 may be facilitated using the data sets that the augmented data set generator 200 generates. Depending on the specific application, this combination of augmented data set generator 200 and handwriting recognition system 400 may inform ordinarily skilled artisans of more specific versions of the neural network-based architectures discussed above. It is the combination itself that yields better results in a handwriting recognition system, without revealing an individual's personally sensitive information, or other confidential information that may be contained in training data sets that may be obtained from natural sources.

Overall, a deep learning model in accordance with aspects of the invention may be implemented by one or more different types of neural networks, possibly in addition to the ones mentioned above, though the ones mentioned above would appear to work particularly well together. As noted, embodiments of the invention focus on the generation of training data to be provided to handwriting recognition models.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A computer-implemented method comprising:
   i) selecting a text character from a plurality of text characters;
   ii) selecting a plurality of fonts from a font set;
   iii) generating the text character in each of the plurality of fonts to generate a content reference set;
   iv) selecting a plurality of images from an image set to generate a style reference set comprising a style selected from a plurality of styles;
   v) transferring the style to the text character in each of the plurality of fonts to generate a set of stylized characters;
   vi) selecting a plurality of stylized characters from the set;
   vii) randomly sequencing the plurality of stylized characters to form an augmented data set; and
   viii) applying the augmented data set to a handwriting recognition system as a training set.

2. The computer-implemented method of claim 1, further comprising repeating i) to viii) for each of the plurality of text characters.

3. The computer-implemented method of claim 1, further comprising repeating i) to viii) for each of the plurality of styles.

4. The computer-implemented method of claim 1, wherein the content reference set is generated before the style reference set.

5. The computer-implemented method of claim 1, wherein the style reference set is generated before the content reference set.

6. The computer-implemented method of claim 1, wherein at least one of the content reference set and the style reference set is selected from previously-generated reference sets.

7. The computer-implemented method of claim 1, further comprising generating the text character from a language model comprising a recurrent neural network (RNN) or long short term memory (LSTM) model.

8. The computer-implemented method of claim 7, wherein the RNN/LSTM model is trained by updating weights using cross-entropy loss calculation.

9. The computer-implemented method of claim 1, further comprising:
   ix) using the handwriting recognition system to recognize handwriting, wherein the handwriting recognition system employs a neural network based system selected from the group consisting of a convolutional neural network (CNN), in conjunction with a bidirectional LSTM (CRNN); and a CNN in combination with a transformer neural network.

10. The computer-implemented method of claim 9, wherein the handwriting recognition model is trained by updating weights using a loss calculation selected from the group consisting of cross-entropy loss and connectionist temporal classification (CTC) loss.

11. An apparatus comprising:
    a neural network based augmented data set generator to generate an augmented data set, the augmented data set generator comprising:
      a content encoder to generate a content reference set comprising a text character selected from a plurality of text characters, the text character generated in each of a plurality of fonts;
      a style encoder to generate a style reference set comprising a plurality of images comprising text characters represented in a style selected from a plurality of styles;
      a mixer to transfer the style to the text character in each of the plurality of fonts to generate a set of stylized characters;
      a selector to select a plurality of stylized characters from the set; and
      a randomized stitcher to randomly sequence the plurality of stylized characters to generate the augmented data set;
    the apparatus further comprising a neural network based handwriting recognition system to receive the augmented data set from the augmented data set generator as a training set, and to recognize handwriting.

12. The apparatus of claim 11, wherein the augmented data set generator generates a plurality of augmented data sets, one for each of the plurality of text characters.

13. The apparatus of claim 11, wherein the augmented data set generator generates a plurality of augmented data sets, one for each of the plurality of styles.

14. The apparatus of claim 11, wherein the augmented data set generator comprises a language model implemented by a recurrent neural network (RNN) or long short term memory (LSTM) model to generate the text character.

15. The apparatus of claim 14, wherein the RNN/LSTM model is trained by updating weights using cross-entropy loss calculation.

16. The apparatus of claim 11, wherein the handwriting recognition system comprises a neural network based model selected from the group consisting of: a convolutional neural network (CNN), in conjunction with a bidirectional LSTM (CRNN); and a CNN in combination with a transformer neural network (CNN+transformer).

17. The apparatus of claim 16, wherein the CRNN is trained using connectionist temporal classification (CTC) loss calculation.

18. The apparatus of claim 16, wherein the CNN+transformer is trained using cross-entropy loss calculation.

19. The apparatus of claim 11, wherein the mixer comprises a bilinear model to map the content reference set and the style reference set to generate the set of stylized characters.

20. The apparatus of claim 11, further comprising imaging equipment to provide some or all of the plurality of text characters used to generate the content reference set, and/or some or all of the plurality of images used to generate the style reference set.

* * * * *